(12) United States Patent
Webb, Jr. et al.

(10) Patent No.: US 6,751,721 B1
(45) Date of Patent: Jun. 15, 2004

(54) BROADCAST INVALIDATE SCHEME

(75) Inventors: David A. J. Webb, Jr., Groton, MA (US); Richard E. Kessler, Shrewsbury, MA (US); Steve Lang, Stow, MA (US); Aaron T. Spink, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 568 days.

(21) Appl. No.: 09/652,165

(22) Filed: Aug. 31, 2000

(51) Int. Cl.[7] .............................................. G06F 13/00
(52) U.S. Cl. ......................................... 712/10; 711/141
(58) Field of Search ........................... 711/141; 712/10; 709/208, 213

(56) References Cited

U.S. PATENT DOCUMENTS

| | | | |
|---|---|---|---|
| 5,261,066 A | 11/1993 | Jouppi et al. ............... | 395/425 |
| 5,317,718 A | 5/1994 | Jouppi ........................ | 395/425 |
| 5,758,183 A | 5/1998 | Scales ........................ | 395/825 |
| 5,761,729 A | 6/1998 | Scales ........................ | 711/148 |
| 5,787,480 A | 7/1998 | Scales et al. ............... | 711/148 |
| 5,802,585 A | 9/1998 | Scales et al. ............... | 711/154 |
| 5,809,450 A | 9/1998 | Chrysos et al. ............. | 702/186 |
| 5,875,151 A | 2/1999 | Mick .......................... | 365/233 |
| 5,890,201 A | 3/1999 | McLellan et al. ........... | 711/108 |
| 5,893,931 A | 4/1999 | Peng et al. ................. | 711/206 |
| 5,918,205 A | 6/1999 | Hammond ................... | 711/205 |
| 5,918,251 A | 6/1999 | Yamada et al. ............. | 711/207 |
| 5,923,872 A | 7/1999 | Chrysos et al. ............. | 395/591 |
| 5,950,228 A | 9/1999 | Scales et al. ............... | 711/148 |
| 5,964,867 A | 10/1999 | Anderson et al. ........... | 712/219 |
| 5,983,325 A | 11/1999 | Lewchuk .................... | 711/137 |
| 6,000,044 A | 12/1999 | Chrysos et al. ............. | 714/47 |
| 6,014,728 A * | 1/2000 | Baror ......................... | 711/133 |
| 6,038,651 A * | 3/2000 | VanHuben et al. .......... | 712/21 |
| 6,070,227 A | 5/2000 | Rokicki ...................... | 711/117 |
| 6,085,300 A | 7/2000 | Sunaga et al. .............. | 711/168 |
| 6,189,078 B1 * | 2/2001 | Bauman et al. ............. | 711/156 |

OTHER PUBLICATIONS

*Alpha Architecture Reference Manual*, Third Edition, The Alpha Architecture Committee, 1998 Digital Equipment Corporation (21 p.), in particular pp.3–1 through 3–15.
*A Logic Design Structure For LSI Testability*, E. B. Eichelberger et al., 1977 IEEE (pp. 462–468).
*Direct RDRAM ™ 256/288–Mbit (512Kx16/18x32s)*, Preliminary Information Document DL0060 Version 1.01 (69 p.).
*Testability Features of AMD–K6 ™ Microprocessor* , R. S. Fetherston et al., Advanced Micro Devices (8 p.).

(List continued on next page.)

Primary Examiner—Eric Coleman (57) ABSTRACT

A directory-based multiprocessor cache control scheme for distributing invalidate messages to change the state of shared data in a computer system. The plurality of processors are grouped into a plurality of clusters. A directory controller tracks copies of shared data sent to processors in the clusters. Upon receiving an exclusive request from a processor requesting permission to modify a shared copy of the data, the directory controller generates invalidate messages requesting that other processors sharing the same data invalidate that data. These invalidate messages are sent via a point-to-point transmission only to master processors in clusters actually containing a shared copy of the data. Upon receiving the invalidate message, the master processors broadcast the invalidate message in an ordered fan-in/fan-out process to each processor in the cluster. All processors within the cluster invalidate a local copy of the shared data if it exists and once the master processor receives acknowledgements from all processors in the cluster, the master processor sends an invalidate acknowledgment message to the processor that originally requested the exclusive rights to the shared data. The cache coherency is scalable and may be implemented using the hybrid point-to-point/broadcast scheme or a conventional point-to-point only directory-based invalidate scheme.

16 Claims, 6 Drawing Sheets

OTHER PUBLICATIONS

*Hardware Fault Containment in Scalable Shared–Memory Multiprocessors*, D. Teodosiu et al., Computer Systems Laboratory, Stanford University (12 p.), 1977.

*Cellular Disco: resource management using virtual clusters on shared–memory multiprocessors*, K. Govil et al., 1999 ACM 1–58113–140–2/99/0012 (16 p.).

*Are Your PLDs Metastable?*, Cypress Semiconductor Corporation, Mar. 6, 1997 (19 p.).

*Rambus® RIMM ™ Module (with 128/144Mb RDRAMs)*, Preliminary Information, Document DL0084 Version 1.1 (12 p.).

*Direct Rambus ™ Module Specification Version 1.0*, Rambus Inc., SL–0006–100 (32 p.), 2000.

*End–To–End Fault Containment In Scalable SharedMemory Multiprocessors*, D. Teodosiu, Jul. 2000 (148 p.).

\* cited by examiner

BROADCAST INVALIDATE SCHEME

CROSS-REFERENCE TO RELATED APPLICATIONS

This application relates to the following commonly assigned co-pending applications entitled:

"Apparatus And Method For Interfacing A High Speed Scan-Path With Slow Speed Test Equipment," Ser. No. 09/653,642, filed Aug. 31, 2000. "Priority Rules For Reducing Network Message Routing Latency," Ser. No. 09/652, 322, filed Aug. 31, 2000. "Scalable Directory Based Cache Coherence Protocol," Ser. No. 09/652,703, now U.S. Pat. No. 6,633,960 filed Aug. 31, 2000, "Scalable Efficient I/O Port Protocol," Ser. No. 09/652,391, filed Aug. 31, 2000, "Efficient Translation Lookaside Buffer Miss Processing In Computer Systems With A Large Range Of Page Sizes," Ser. No. 09/652,552, filed Aug. 31, 2000, "Fault Containment And Error Recovery Techniques in A Scalable Multiprocessor," Ser. No. 09/651,949, now U.S. Pat. No. 6,678,840, filed Aug. 31, 2000, "Speculative Directory Writes In A Directory Based Cache Coherent Non-uniform Memory Access Protocol," Ser. No. 09/652,834, filed Aug. 31, 2000, "Special Encoding Of Known Bad Data," Ser. No. 09/652,341, now U.S. Pat. No. 6,662,319, filed Aug. 31, 2000, "Mechanism To Track All Open Pages In A DRAM Memory System," Ser. No. 09/652,704, now U.S. Pat. No. 6,662,265, filed Aug. 31, 2000. "Programmable DRAM Address Mapping Mechanism," Ser. No. 09/653,093, now U.S. Pat. No. 6,546,453, filed Aug. 31, 2000, "Computer Architecture And System For Efficient Management of Bi-Directional BusMechanism" Ser. No. 09/652,323, filed Aug. 31, 2000, "An Efficient Address Interleaving With Simultaneous Multiple Locality Options," Ser. No. 09/652, 452, now U.S. Pat. No. 6,567,900, filed Aug. 31, 2000, "A High Performance Way Allocation Strategy For A Multi-Way Associative Cache System," Ser. No. 09/653,092, filed Aug. 31, 2000, "Method And System For Absorbing Defects In High Performance Microprocessor With A Large N-Way Set Associative Cache," Ser. No. 09/651,948, now U.S. Pat. No. 6,671,822, filed Aug. 31, 2000, "A Method For Reducing Directory Writes And Latency In A High Performance Directory Based, Coherency Protocol," Ser. No. 09/652,324, now U.S. Pat. No. 6,654,859, filed Aug. 31, 2000, "Mechanism To Reorder Memory Read And Write Transactions For Reduced Latency And Increased Bandwidth," Ser. No. 09/653,094, now U.S. Pat. No. 6,591,349, filed Aug. 31, 2000, "System For Minimizing Memory Bank Conflicts in A Computer System," Ser. No. 09/652,325, now U.S. Pat. No. 6,622,225, filed Aug. 31, 2000, "Computer Resource Management And Allocation System" Ser. No. 09/651,945, filed Aug. 31, 2000, "Input Data Recovery Scheme," Ser. No. 09/653,643, now U.S. Pat. No. 6,668,335, filed Aug. 31, 2000, "Fast Lane Prefetching," Ser. No. 09/652,451, now U.S. Pat. No. 6,681,295, filed Aug. 31, 2000, "A Mechanism For Synchronizing Multiple Skewed Source-Synchronous Data Channels With Automatic Initialization Feature," Ser. No. 09/652,480, now U.S. Pat. No. 6,636,955, filed Aug. 31, 2000, "A Mechanism To Control The Allocation Of An N-Source Shared Buffer," Ser. No. 09/651,924, filed Aug. 31, 2000, and "Chaining Directory Reads And Writes To Reduce DRAM Bandwidth In A Directory Based CC-NUMA Protocol," Ser. No. 09/652,315, now U.S. Pat. No. 6,546,465, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to a pipelined, superscalar microprocessor. More particularly, the invention relates to multi-processor memory cache coherency and a scheme for delivering cache invalidate requests and receiving invalidate acknowledgements in a scalable multi-processor environment.

2. Background of the Invention

It often is desirable to include multiple processors in a single computer system. This is especially true for computationally intensive applications and applications that otherwise can benefit from having more than one processor simultaneously performing various tasks. It is not uncommon for a multi-processor system to have 2 or 4 or more processors working in concert with one another. Typically, each processor couples to at least one and perhaps three or four other processors.

Such systems usually require data and commands (e.g., read requests, write requests, etc.) to be transmitted from one processor to another. Furthermore, the processors may be executing tasks and working on identical problems which requires that data be shared among the processors. This data is commonly stored in a memory location that may be adjacent to each processor or may be located in a distinctly separate location. In either event, the processor must access the data from memory. If the memory is some distance away from the processor, delays are incurred as the data request is transmitted to a memory controller and the data is transmitted back to the processor. To alleviate this type of problem, a memory cache may be coupled to each processor. The memory cache is used to store "local" copies of data that is "permanently" stored at the master memory location. Since the data is local, fetch and retrieve times are reduced thereby decreasing execution times. The memory controller may distribute copies of that same data to other processors as needed.

Successful implementation of this type of memory structure requires a method of keeping track of the copies of data that are delivered to the various cache blocks. Furthermore, it may be necessary for a processor to alter the data in the local cache. In this scenario, the processor must determine if the data in question is an exclusive copy of the data. That is, the data in the local cache must be the only "copy" of the data outside of the main memory location. If the data is exclusive, the processor may write to the data block. If the data is shared (i.e., one of at least two copies of data outside the main memory location), the processor must first request and gain exclusive rights to the data before the data can be altered. When the memory controller receives an exclusive request, various techniques exist for notifying other processors that there is an exclusive request pending for that particular data block.

The particular technique chosen depends on the cache coherency protocol implemented for that particular multi-processor system. Cache coherency, in part, means that only one microprocessor can modify any part of the data at any one time, otherwise the state of the system would be nondeterministic. Before exclusive rights to the data block may be granted to the requestor, any other copies of that data block must be invalidated. In one example of a cache coherency protocol, the memory controller will broadcast an invalidate request to each processor in the system, regardless of whether or not the processors have a copy of the data block. This approach tends to require less bookkeeping since the memory controller and processors do not need to keep track of how many copies of data exist in the memory structure. However, bandwidth is hindered because processors must check to see if there is a local copy of the data block each time the processor receives an invalidate request.

Another conventional cache coherency protocol is a directory based protocol. In this type of system, the memory controller keeps a master list, or directory, of the data in main memory. When copies of the data are distributed to the individual processors, the memory controller will note the processor to which the data was sent and the status of that data. When an exclusive ownership request comes from a processor, the memory controller sends the invalidate requests only to the processors that have copies of the same block of data. Contrary to the broadcast coherency method described above, bandwidth is conserved by limiting invalidate traffic to those processors which have a copy of a data block in the local cache. The performance benefits that result from a directory based coherence protocol come at the expense of more overhead in terms of storage and memory required to store and update the directory. For instance, a share mask may be needed to successfully keep track of those processors which have a copy of a data block. A share mask may be a data register with as many bit locations as there are processors in the system. When a copy of data is delivered to a processor, the memory (or directory) controller may set a bit in a location within the register corresponding to that processor. Thus, when an invalidate request needs to be sent, the controller will send the request only to those processors corresponding to the bits that are set in the share mask. With design forethought and resource allocation, a directory based cache coherency may be implemented in multi-processor systems of varying size.

A problem arises however, when systems are scaled to the point where there are more processors than that for which the directory structure can account. For example, a share mask may include twenty bit locations in the data register, but a system may be designed with thirty-two microprocessors. In this example, it would be difficult, if not impossible, to keep track of the shared data blocks in all of the processor memory caches. Similarly, system designers may consciously desire to keep the directory structure overhead at a certain size while increasing the processor capability of the system. The limited nature of this shared directory structure should not limit the size of the multi-processor system.

It is desirable therefore, to develop a scalable, directory-based cache coherency that may be used in multi-processor systems of varying sizes. The cache coherency distributes invalidate messages much like a conventional directory based coherency for small systems and operates using a hybrid directory and broadcast based invalidation scheme for larger systems. The invention may advantageously provide system designers flexibility in implementing the cache coherency. The cache coherency scheme may also advantageously reduce system cost by allowing a standard coherency platform to be delivered with product lines of varying size.

BRIEF SUMMARY OF THE INVENTION

The problems noted above are solved in large part by a directory-based multiprocessor cache control system for distributing invalidate messages to change the state of shared data in a computer system. The plurality of processors may be grouped into a plurality of clusters. A directory controller tracks copies of shared data sent to processors in the clusters. This tracking is accomplished using a share mask data register that contains at least as many bit locations as there are clusters. When a block of data from main memory is distributed to a processor, the directory controller will set a bit in the share mask corresponding to the cluster in which the sharing processor is located. Upon receiving an exclusive request from a processor requesting permission to modify a shared copy of the data, the directory controller generates invalidate messages requesting that other processors sharing the same data invalidate that data. These invalidate messages are sent via a point-to-point transmission only to master processors in clusters actually containing a shared copy of the data. Upon receiving the invalidate message, the master processors broadcast the invalidate message in an ordered fan-in/fan-out process to each processor in the cluster. The path by which the invalidate messages are broadcast within a cluster is determined by control and status registers associated with each processor in the system. These registers include configuration information which establishes to which processors, if any, a processor should forward the broadcast invalidate message. All processors within the cluster invalidate a local copy of the shared data if it exists and if the processor is not a requestor. The processors then send acknowledgement messages to the processor from which the invalidate message was received. Once the master processor receives acknowledgements from all processors in the cluster, the master processor sends an invalidate acknowledgment message to the processor that originally requested the exclusive rights to the shared data. The cache coherency is scalable and may be implemented using the hybrid point-to-point/broadcast scheme or a conventional point-to-point only directory-based invalidate scheme. A PID-SHIFT register holds configuration information that determines which implementation shall be used. If the PID-SHIFT register holds the value zero, a conventional point-to-point invalidate scheme will be used. For other values in the PID-SHIFT register, the value determines the number of processors grouped per cluster and establishes that the hybrid invalidate scheme shall be used.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
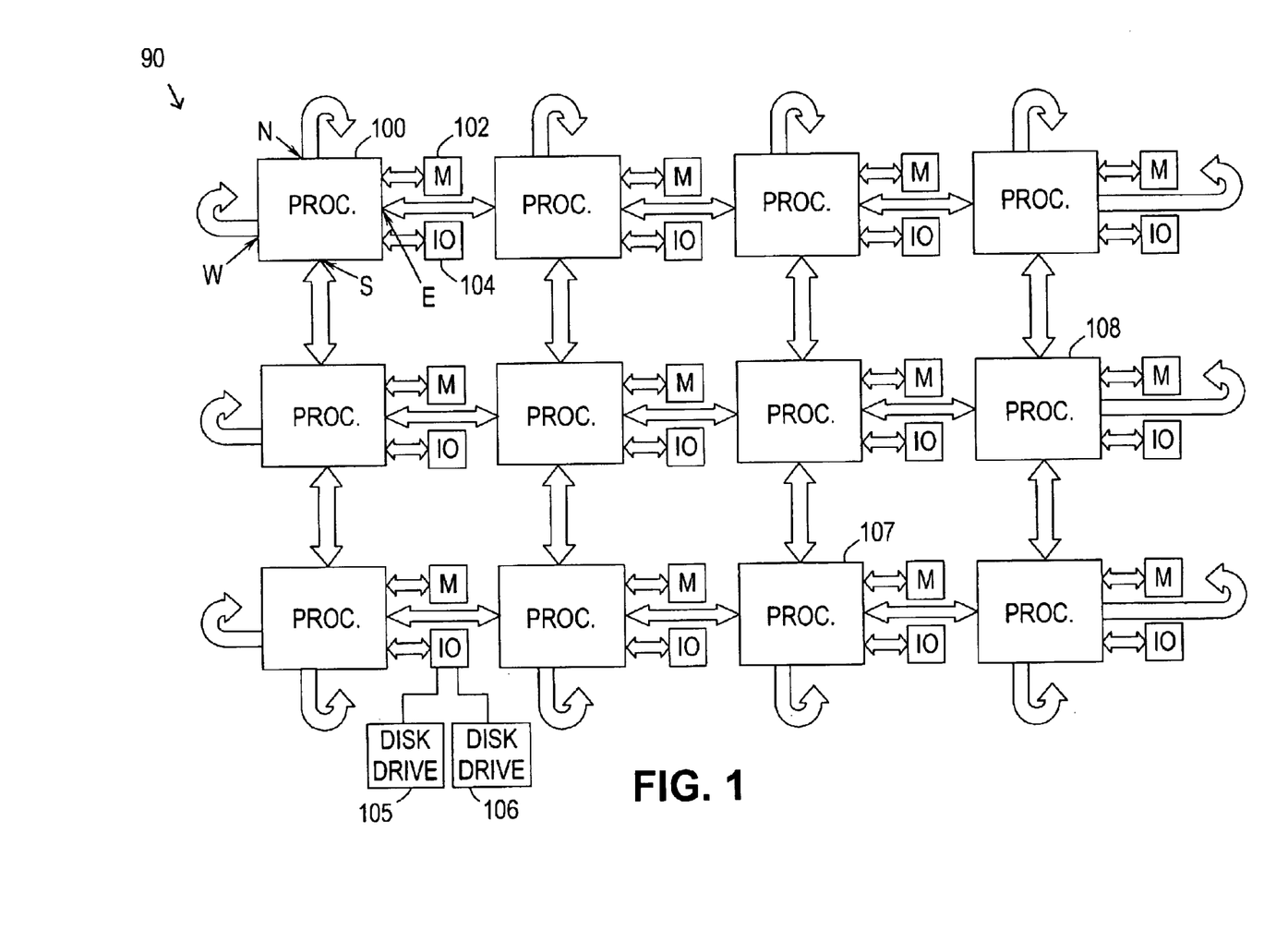
FIG. 1 shows a system diagram of a plurality of microprocessors coupled together.

Referring now to FIG. 1, in accordance with the preferred embodiment of the invention, computer system 90 comprises one or more processors 100 coupled to a memory 102 and an input/output ("I/O") controller 104. As shown, computer system 90 includes twelve processors 100, each processor coupled to a memory and an I/O controller. Each processor preferably includes four ports for connection to adjacent processors. The interprocessor ports are designated "North," "South," "East," and "West" in accordance with the well-known Manhattan grid architecture also known as a crossbar interconnection network architecture. As such, each processor 100 can be connected to four other processors. The processors on both ends of the system layout wrap around and connect to processors on the opposite side to implement a 2D torus-type connection. Although twelve processors 100 are shown in the exemplary embodiment of FIG. 1, any desired number of processors (e.g., 256) can be included. For purposes of the following discussion, the processor in the upper, left-hand corner of FIG. 1 will be discussed with the understanding that the other processors 100 are similarly configured in the preferred embodiment.

As noted, each processor preferably has an associated I/O controller 104. The I/O controller 104 provides an interface to various input/output devices such as disk drives 105 and 106, as shown in the lower, left-hand corner of FIG. 1. Data from the I/O devices thus enters the 2D torus via the I/O controllers.

Each processor also, preferably, has an associated memory 102. In accordance with the preferred embodiment, the memory 102 preferably comprises RAMbus™ memory devices, but other types of memory devices can be used, if desired. The capacity of the memory devices 102 can be any suitable size. Further, memory devices 102 preferably are implemented as Rambus Interface Memory Modules ("RIMM").

In general, computer system 90 can be configured so that any processor 100 can access its own memory 102 and I/O devices, as well as the memory and I/O devices of all other processors in the system. Preferably, the computer system may have physical connections between each processor resulting in low interprocessor communication times and improved memory and I/O device access reliability. If physical connections are not present between each pair of processors, a pass-through or bypass path is preferably implemented in each processor that permits accesses to a processor's memory and I/O devices by another processor through one or more pass-through processors.

Referring still to FIG. 1, a conventional directory-based, share invalidate scheme may be implemented in the multiprocessor system shown. In FIG. 1, memory is distributed about all the processors 100 in the multiprocessor system. Thus, each processor includes a memory manager and directory structure for the local memory. Consider for example, a block of data that resides in the main memory coupled to processor 107. In this context, processor 107 may be considered the owner of this particular block of data. Furthermore, with regards to this particular block of data, processor 107 may also be considered the directory processor or directory node. Assume also that shared copies of the data block reside in the cache memory for processors 100 and 108. If processor 100 needs to modify the shared block of data, processor 100 will transmit a request for exclusive ownership of the data to the data owner, processor 107. The memory manager for processor 107 may preferably have control of a share mask which forms part of a coherence directory which is stored with each block of data. The share mask is comprised of a data register with at least 12 bits (one for each processor in FIG. 1). In the preferred embodiment, the share mask is a 20 bit data register. In the example system shown in FIG. 1, only 12 of the 20 bit locations would be used and two of the 12 bits (corresponding to processors 100 and 108) are set indicating that processors 100 and 108 share the block of data. Processor 107 preferably sends a response back to processor 100 indicating the number of shared copies of the data in existence. In this example, there is only one other shared copy of the data block. Upon receiving the response from the directory node, processor 100 may preferably change the state of the shared data block to exclusive. However, processor 100 must wait to receive one acknowledgment before it can modify the data block. In an alternative embodiment, processor 100 may wait until it receives all outstanding acknowledgments before it changes the state of the shared data block to exclusive.

Processor 107 also preferably transmits a ShareInval request to processor 108. The ShareInval message is a command to change the status of a shared data block to invalid. In response to the ShareInval request, processor 108 will change the state of the shared data block from shared to invalid and preferably transmit an invalidate acknowledgment, InvalAck, to the original exclusive requester, processor 100. Upon receiving the one expected InvalAck signal, processor 100 may then write to the exclusive copy of the data block. In general, the requesting processor 100 must wait for all acknowledgements, the number of which is indicated by the directory controller 107, before modifying the exclusive data block.

Figure 2A:
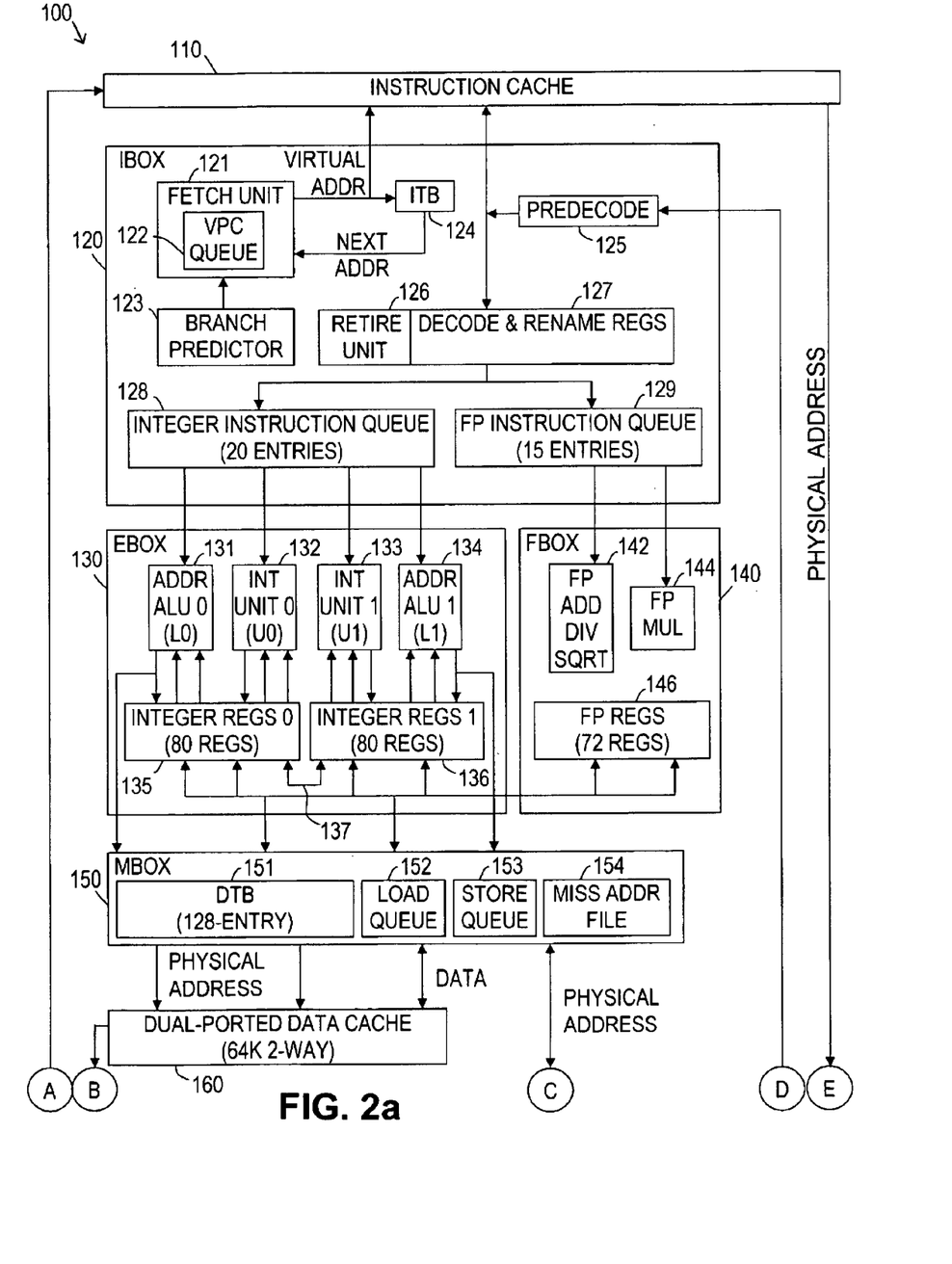
FIGS. 2a and 2b show a block diagram of the microprocessors of FIG. 1.
Figure 2B:
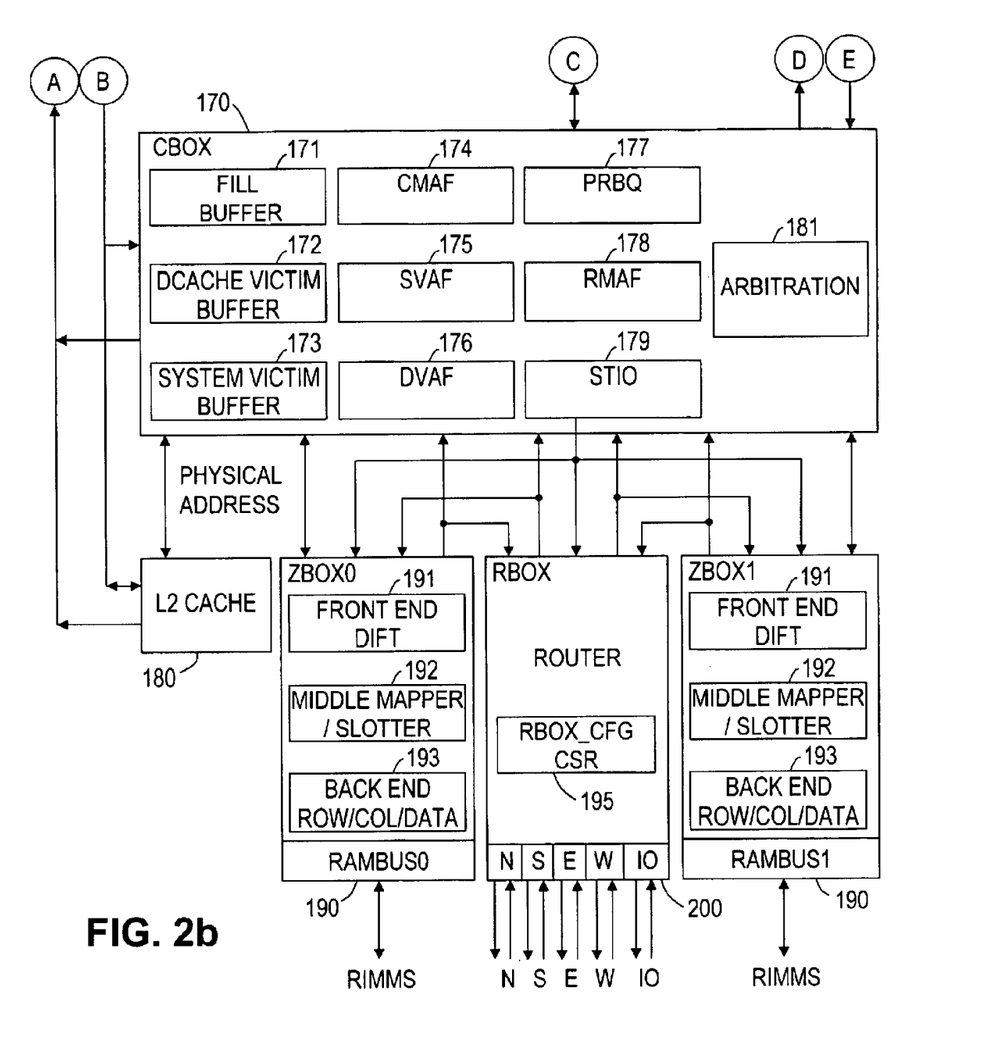

Referring now to FIGS. 2A and 2B, each processor 100 preferably includes an instruction cache 110, an instruction fetch, issue and retire unit ("Ibox") 120, an integer execution unit ("Ebox") 130, a floating-point execution unit ("Fbox") 140, a memory reference unit ("Mbox") 150, a data cache 160, an L2 instruction and data cache control unit ("Cbox") 170, a level L2 cache 180, two memory controllers ("Zbox0" and "Zbox1") 190, and an interprocessor and I/O router unit ("Rbox") 200. The following discussion describes each of these units.

Each of the various functional units 110–200 contains control logic that communicates with the control logic of various other functional units, control logic as shown. The instruction cache control logic 110 communicates with the Ibox 120, Cbox 170, and L2 Cache 180. In addition to the control logic communicating with the instruction cache 110, the Ibox control logic 120 communicates with Ebox 130, Fbox 140 and Cbox 170. The Ebox 130 and Fbox 140 control logic both communicate with the Mbox 150, which in turn communicates with the data cache 160 and Cbox 170. The Cbox control logic also communicates with the L2 cache 180, Zboxes 190, and Rbox 200.

Referring still to FIGS. 2*a* and 2*b*, the Ibox 120 preferably includes a fetch unit 121 which contains a virtual program counter ("VPC") 122, a branch predictor 123, an instruction-stream translation buffer 124, an instruction predecoder 125, a retire unit 126, decode and rename registers 127, an integer instruction queue 128, and a floating point instruction queue 129. Generally, the VPC 122 maintains virtual addresses for instructions that are in flight. An instruction is said to be "in-flight" from the time it is fetched until it retires or aborts. The Ibox 120 can accommodate as many as 80 instructions, in 20 successive fetch slots, in flight between the decode and rename registers 127 and the end of the pipeline. The VPC preferably includes a 20-entry table to store these fetched VPC addresses.

With regard to branch instructions, the Ibox 120 uses the branch predictor 123. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the fetch unit in the processor fetches the branch instruction. In order to keep the pipeline full, which is desirable for efficient operation, the processor includes branch prediction logic that predicts the outcome of a branch instruction before it is actually executed (also referred to as "speculating"). The branch predictor 123, which receives addresses from the VPC queue 122, preferably bases its speculation on short and long-term history of prior instruction branches. As such, using branch prediction logic, a processor's fetch unit can speculate the outcome of a branch instruction before it is actually executed. The speculation, however, may or may not turn out to be accurate. That is, the branch predictor logic may guess wrong regarding the direction of program execution following a branch instruction. If the speculation proves to have been accurate, which is determined when the processor executes the branch instruction, then the next instructions to be executed have already been fetched and are working their way through the pipeline.

If, however, the branch speculation performed by the branch predictor 123 turns out to have been the wrong prediction (referred to as "misprediction" or "misspeculation"), many or all of the instructions behind the branch instruction may have to be flushed from the pipeline (i.e., not executed) because of the incorrect fork taken after the branch instruction. Branch predictor 123 uses any suitable branch prediction algorithm, however, that results in correct speculations more often than misspeculations, and the overall performance of the processor is better (even in the face of some misspeculations) than if speculation was turned off.

The instruction translation buffer ("ITB") 124 couples to the instruction cache 110 and the fetch unit 121. The ITB 124 comprises a 128-entry, fully associative instruction-stream translation buffer that is used to store recently used instruction-stream address translations and page protection information. Preferably, each of the entries in the ITB 124 may be 1, 8, 64 or 512 contiguous 8-kilobyte ("KB") pages or 1, 32, 512, 8192 contiguous 64-kilobyte pages. The allocation scheme used for the ITB 124 is a round-robin scheme, although other schemes can be used as desired.

The predecoder 125 reads an octaword (16 contiguous bytes) from the instruction cache 110. Each octaword read from instruction cache may contain up to four naturally aligned instructions per cycle. Branch prediction and line prediction bits accompany the four instructions fetched by the predecoder 125. The branch prediction scheme implemented in branch predictor 123 generally works most efficiently when only one branch instruction is contained among the four fetched instructions. The predecoder 125 predicts the instruction cache line that the branch predictor 123 will generate. The predecoder 125 generates fetch requests for additional instruction cache lines and stores the instruction stream data in the instruction cache.

Referring still to FIGS. 2a and 2b, the retire unit 126 fetches instructions in program order, executes them out of order, and then retires (also called "committing" an instruction) them in order. The Ibox 120 logic maintains the architectural state of the processor by retiring an instruction only if all previous instructions have executed without generating exceptions or branch mispredictions. An exception is any event that causes suspension of normal instruction execution. Retiring an instruction commits the processor to any changes that the instruction may have made to the software accessible registers and memory. The processor 100 preferably includes the following three machine code accessible hardware: integer and floating-point registers, memory, internal processor registers. The retire unit 126 of the preferred embodiment can retire instructions at a sustained rate of eight instructions per cycle, and can retire as many as 11 instructions in a single cycle.

The decode and rename registers 127 contains logic that forwards instructions to the integer and floating-point instruction queues 128, 129. The decode and rename registers 127 perform preferably the following two functions. First, the decode and rename registers 127 eliminates register write-after-read ("WAR") and write-after-write ("WAW") data dependency while preserving true read-after-write ("RAW") data dependencies. This permits instructions to be dynamically rescheduled. Second, the decode and rename registers 127 permits the processor to speculatively execute instructions before the control flow previous to those instructions is resolved.

The logic in the decode and rename registers 127 preferably translates each instruction's operand register specifiers from the virtual register numbers in the instruction to the physical register numbers that hold the corresponding architecturally-correct values. The logic also renames each instruction destination register specifier from the virtual number in the instruction to a physical register number chosen from a list of free physical registers, and updates the register maps. The decode and rename register logic can process four instructions per cycle. Preferably, the logic in the decode and rename registers 127 does not return the physical register, which holds the old value of an instruction's virtual destination register, to the free list until the instruction has been retired, indicating that the control flow up to that instruction has been resolved.

If a branch misprediction or exception occurs, the register logic backs up the contents of the integer and floating-point rename registers to the state associated with the instruction that triggered the condition, and the fetch unit 121 restarts at the appropriate Virtual Program Counter ("VPC"). Preferably, as noted above, twenty valid fetch slots containing up to eighty instructions can be in flight between the registers 127 and the end of the processor's pipeline, where control flow is finally resolved. The register 127 logic is capable of backing up the contents of the registers to the state associated with any of these 80 instructions in a single cycle. The register logic 127 preferably places instructions into the integer or floating-point issue queues 128, 129, from which they are later issued to functional units 130 or 136 for execution.

The integer instruction queue 128 preferably includes capacity for twenty integer instructions. The integer instruction queue 128 issues instructions at a maximum rate of four instructions per cycle. The specific types of instructions processed through queue 128 include: integer operate commands, integer conditional branches, unconditional branches (both displacement and memory formats), integer and floating-point load and store commands, Privileged Architecture Library ("PAL") reserved instructions, integer-to-floating-point and floating-point-integer conversion commands.

Referring still to FIGS. 2a and 2b, the integer execution unit ("Ebox") 130 includes arithmetic logic units ("ALUs") 131, 132, 133, and 134 and two integer register files 135. Ebox 130 preferably comprises a 4-path integer execution unit that is implemented as two functional-unit "clusters" labeled 0 and 1. Each cluster contains a copy of an 80-entry, physical-register file and two subclusters, named upper ("U") and lower ("L"). As such, the subclusters 131–134 are labeled U0, L0, U1, and L1. Bus 137 provides cross-cluster communication for moving integer result values between the clusters.

The subclusters 131–134 include various components that are not specifically shown in FIG. 2a. For example, the subclusters preferably include four 64-bit adders that are used to calculate results for integer add instructions, logic units, barrel shifters and associated byte logic, conditional branch logic, a pipelined multiplier for integer multiply operations, and other components known to those of ordinary skill in the art.

Each entry in the integer instruction queue 128 preferably asserts four request signals—one for each of the Ebox 130 subclusters 131, 132, 133, and 134. A queue entry asserts a request when it contains an instruction that can be executed by the subcluster, if the instruction's operand register values are available within the subcluster. The integer instruction queue 128 includes two arbiters—one for the upper subclusters 132 and 133 and another arbiter for the lower subclusters 131 and 134. Each arbiter selects two of the possible twenty requesters for service each cycle. Preferably, the integer instruction queue 128 arbiters choose between simultaneous requesters of a subcluster based on the age of the request—older requests are given priority over newer requests. If a given instruction requests both lower subclusters, and no older instruction requests a lower subcluster, then the arbiter preferably assigns subcluster 131 to the instruction. If a given instruction requests both upper subclusters, and no older instruction requests an upper subcluster, then the arbiter preferably assigns subcluster 133 to the instruction.

The floating-point instruction queue 129 preferably comprises a 15-entry queue and issues the following types of instructions: floating-point operates, floating-point conditional branches, floating-point stores, and floating-point register to integer register transfers. Each queue entry preferably includes three request lines—one for the add pipeline, one for the multiply pipeline, and one for the two store pipelines. The floating-point instruction queue 129 includes three arbiters—one for each of the add, multiply, and store pipelines. The add and multiply arbiters select one requester per cycle, while the store pipeline arbiter selects two requesters per cycle, one for each store pipeline. As with the integer instruction queue 128 arbiters, the floating-point instruction queue arbiters select between simultaneous requesters of a pipeline based on the age of the request— older request are given priority. Preferably, floating-point store instructions and floating-point register to integer register transfer instructions in even numbered queue entries arbitrate for one store port. Floating-point store instructions and floating-point register to integer register transfer instructions in odd numbered queue entries arbitrate for the second store port.

Floating-point store instructions and floating-point register-to-integer-register transfer instructions are queued in both the integer and floating-point queues. These instructions wait in the floating-point queue until their operand register values are available from the floating—point execution unit ("Fbox") registers. The processor executing these instructions subsequently request service from the store arbiter. Upon being issued from the floating-point queue 129, the processor executing these instructions signal the corresponding entry in the integer queue 128 to request service. Finally, the operation is complete after the instruction is issued from the integer queue 128.

The integer registers 135, 136 preferably contain storage for the processor's integer registers, results written by instructions that have not yet been retired, and other information as desired. The two register files 135, 136 preferably contain identical values. Each register file preferably includes four read ports and six write ports. The four read ports are used to source operands to each of the two subclusters within a cluster. The six write ports are used to write results generated within the cluster or another cluster and to write results from load instructions.

The floating-point execution queue ("Fbox") 129 contains a floating-point add, divide and square-root calculation unit 142, a floating-point multiply unit 144 and a register file 146. Floating-point add, divide and square root operations are handled by the floating-point add, divide and square root calculation unit 142 while floating-point operations are handled by the multiply unit 144.

The register file 146 preferably provides storage for seventy-two entries including thirty-one floating-point registers and forty-one values written by instructions that have not yet been retired. The Fbox register file 146 contains six read ports and four write ports (not specifically shown). Four read ports are used to source operands to the add and multiply pipelines, and two read ports are used to source data for store instructions. Two write ports are used to write results generated by the add and multiply pipelines, and two write ports are used to write results from floating-point load instructions.

Referring still to FIG. 2a, the Mbox 150 controls the L1 data cache 160 and ensures architecturally correct behavior for load and store instructions. The Mbox 150 preferably contains a datastream translation buffer ("DTB") 151, a load queue ("LQ") 152, a store queue ("SQ") 153, and a miss address file ("MAF") 154. The DTB 151 preferably comprises a fully associative translation buffer that is used to store data stream address translations and page protection information. Each of the entries in the DTB 151 can map 1, 8, 64, or 512 contiguous 8-KB pages. The allocation scheme preferably is round robin, although other suitable schemes could also be used. The DTB 151 also supports an 8-bit Address Space Number ("ASN") and contains an Address Space Match ("ASM") bit. The ASN is an optionally implemented register used to reduce the need for invalidation of cached address translations for process-specific addresses when a context switch occurs.

The LQ 152 preferably is a reorder buffer used for load instructions. It preferably contains thirty-two entries and maintains the state associated with load instructions that have been issued to the Mbox 150, but for which results have not been delivered to the processor and the instructions retired. The Mbox 150 assigns load instructions to LQ slots based on the order in which they were fetched from the instruction cache 110, and then places them into the LQ 152 after they are issued by the integer instruction queue 128. The LQ 152 also helps to ensure correct memory reference behavior for the processor.

The SQ 153 preferably is a reorder buffer and graduation unit for store instructions. It preferably contains thirty-two entries and maintains the state associated with store instructions that have been issued to the Mbox 150, but for which data has not been written to the data cache 160 and the instruction retired. The Mbox 150 assigns store instructions to SQ slots based on the order in which they were fetched from the instruction cache 110 and places them into the SQ 153 after they are issued by the instruction cache 110. The SQ 153 holds data associated with the store instructions issued from the integer instruction unit 128 until they are retired, at which point the store can be allowed to update the data cache 160. The LQ 152 also helps to ensure correct memory reference behavior for the processor. The miss address file ("MAF") 154 preferably comprises a 16-entry file that holds physical addresses associated with pending instruction cache 110 and data cache 160 fill requests and pending input/output ("I/O") space read transactions.

Processor 100 preferably includes two on-chip primary-level ("L1") instruction and data caches 110 and 160, and a single secondary-level, unified instruction/data ("L2") cache 180 (FIG. 2b). The L1 instruction cache 110 preferably comprises a 64-KB virtual-addressed, two-way set-associative cache. Prediction of future instruction execution is used to improve the performance of the two-way set-associative cache without slowing the cache access time. Each instruction cache block preferably contains a plurality (preferably 16) instructions, virtual tag bits, an address space number, an address space match bit, a one-bit PALcode bit to indicate physical addressing, a valid bit, data and tag parity bits, four access-check bits, and predecoded information to assist with instruction processing and fetch control.

The L1 data cache 160 preferably comprises a 64 KB, two-way set associative, virtually indexed, physically tagged, write-back, read/write allocate cache with 64-byte cache blocks. During each cycle the data cache 160 preferably performs one of the following transactions: two quadword (or shorter) read transactions to arbitrary addresses, two quadword write transactions to the same aligned octaword, two non-overlapping less-than quadword writes to the same aligned quadword, one sequential read and write transaction from and to the same aligned octaword. Preferably, each data cache block contains 64 data bytes and associated quadword ECC bits, physical tag bits, valid, dirty, shared, and modified bits, tag parity bit calculated across the tag, dirty, shared, and modified bits, and one bit to control round-robin set allocation. The data cache 160 preferably is organized to contain two sets, each with 512 rows containing 64-byte blocks per row (i.e., 32 KB of data per set). The processor 100 uses two additional bits of virtual address beyond the bits that specify an 8-KB page in order to specify the data cache row index. A given virtual address might be found in four unique locations in the data cache 160, depending on the virtual-to-physical translation for those two bits. The processor 100 prevents this aliasing by keeping only one of the four possible translated addresses in the cache at any time.

As will be understood by one skilled in the art, the L2 cache 180 comprises a secondary cache for the processor 100, which typically is implemented on a separate chip. The L2 cache 180 preferably comprises a 1.75-MB, seven-way set associative write-back mixed instruction and data cache. Preferably, the L2 cache holds physical address data and coherence state bits for each block.

Referring now to FIG. 2b, the L2 instruction and data cache control unit ("Cbox") 170 controls the L2 instruction and data cache 190 and system ports. As shown, the Cbox 170 contains a fill buffer 171, a data cache victim buffer 172, a system victim buffer 173, a cache miss address file ("CMAF") 174, a system victim address file ("SVAF") 175, a data victim address file ("DVAF") 176, a probe queue ("PRBQ") 177, a requester miss-address file ("RMAF") 178, a store to I/O space ("STIO") 179, and an arbitration unit 181.

The fill buffer 171 in the Cbox preferably buffers data received from other functional units outside the Cbox 170. The data and instructions get written into the fill buffer 171 and other logic units in the Cbox 170 process the data and instructions before sending to another functional unit or the L1 cache 110 and 160. The data cache victim buffer ("VDF") 172 preferably stores data flushed from the L1 cache 110 and 160 or sent to the System Victim Data Buffer 173. The System Victim Data Buffer ("SVDB") 173 sends data flushed from the L2 cache to other processors in the system and to memory. Cbox Miss-Address File ("CMAF") 174 preferably holds addresses of L1 cache misses. CMAF 174 updates and maintains the status of these addresses. The System Victim-Address File ("SVAF") 175 in the Cbox 170 preferably contains the addresses of all SVDB data entries. Data Victim-Address File ("DVAF") 176 preferably contains the addresses of all data cache victim buffer ("VDF") 172 data entries.

The Probe Queue ("PRBQ") 177 preferably comprises a 18-entry queue that holds pending system port cache probe commands and addresses. The Probe Queue 177 includes 10 remote request entries, 8 forward entries, and lookup L2 tags and requests from the PRBQ content addressable memory ("CAM") against the RMAF, CMAF and SVAF. Requestor Miss-Address Files ("RMAF") 178 in the Cbox 170 preferably accepts requests and responds with data or instructions from the L2 cache. Data accesses from other functional units in the processor, other processors in the computer system or any other devices that might need data out of the L2 cache are sent to the RMAF 178 for service. The Store Input/Output ("STIO") 179 preferably transfer data from the local processor to I/O cards in the computer system. Finally, arbitration unit 181 in the Cbox 170 preferably arbitrates between load and store accesses to the same memory location of the L2 cache and informs other logic blocks in the Cbox and computer system functional units of the conflict.

Referring still to FIG. 2b, processor 100 preferably includes dual, integrated RAMbus™ memory controllers 190 (Zbox0 and Zbox1). Each Zbox 190 controls 4 or 5 channels of information flow with the main memory 102 (FIG. 1). Each Zbox 190 preferably includes a front-end directory in flight table ("DIFT") 191, a middle mapper 192, and a back end 193. The front-end DIFT 191 performs a number of functions such as managing the processor's directory-based memory coherency protocol, processing request commands from the Cbox 170 and Rbox 200, sending forward commands to the Rbox 200, sending response commands to and receiving packets from the Cbox 170 and Rbox 200, and tracking up to thirty-two in-flight transactions. The front-end DIFT 191 also sends directory read and write requests to the Zbox 190 and conditionally updates directory information based on request type, Local Probe Response ("LPR") status and directory state.

The middle mapper 192 maps the physical address into RAMbus™ device format by device, bank, row, and column. The middle mapper 192 also maintains an open-page table to track all open pages and to close pages on demand if bank conflicts arise. The mapper 192 also schedules RAMbus™ transactions such as timer-base request queues. The Zbox back end 193 preferably packetizes the address, control, and data into RAMbus™ format and provides the electrical interface to the RAMbus™ devices themselves.

The Rbox 200 provides the interfaces to as many as four other processors and one I/O controller 104 (FIG. 1). The inter-processor interfaces are designated as North ("N"), South ("S"), East ("E"), and West ("W") and provide two-way communication between adjacent processors. The Rbox 200 also includes configuration and status registers ("CSR") 195 that govern distribution of broadcast invalidate messages. Description of the broadcast invalidate distribution is discussed in further detail below.

In the preferred embodiment, the directory information within the DIFT 191 in the Zbox 190 includes the share mask that is used to track shared copies of data outside of main memory. The directory also comprises a configuration register that determines which implementation of the cache coherency invalidate scheme is currently in use. This configuration register is preferably called the ZBOX*_DIFT_CTL[PIDSHIFT] register or simply the PID-SHIFT register. If the value of the PID-SHIFT register is set to zero, the multi-processor system will operate with a conventional invalidate scheme as described above. For other values of this register, n, the multi-processor system will operate with a hybrid invalidate scheme. The term "hybrid" is used to indicate that the cache coherency distributes invalidate requests using both a directory based point-to-point transmission and a broadcast transmission.

Figure 3:
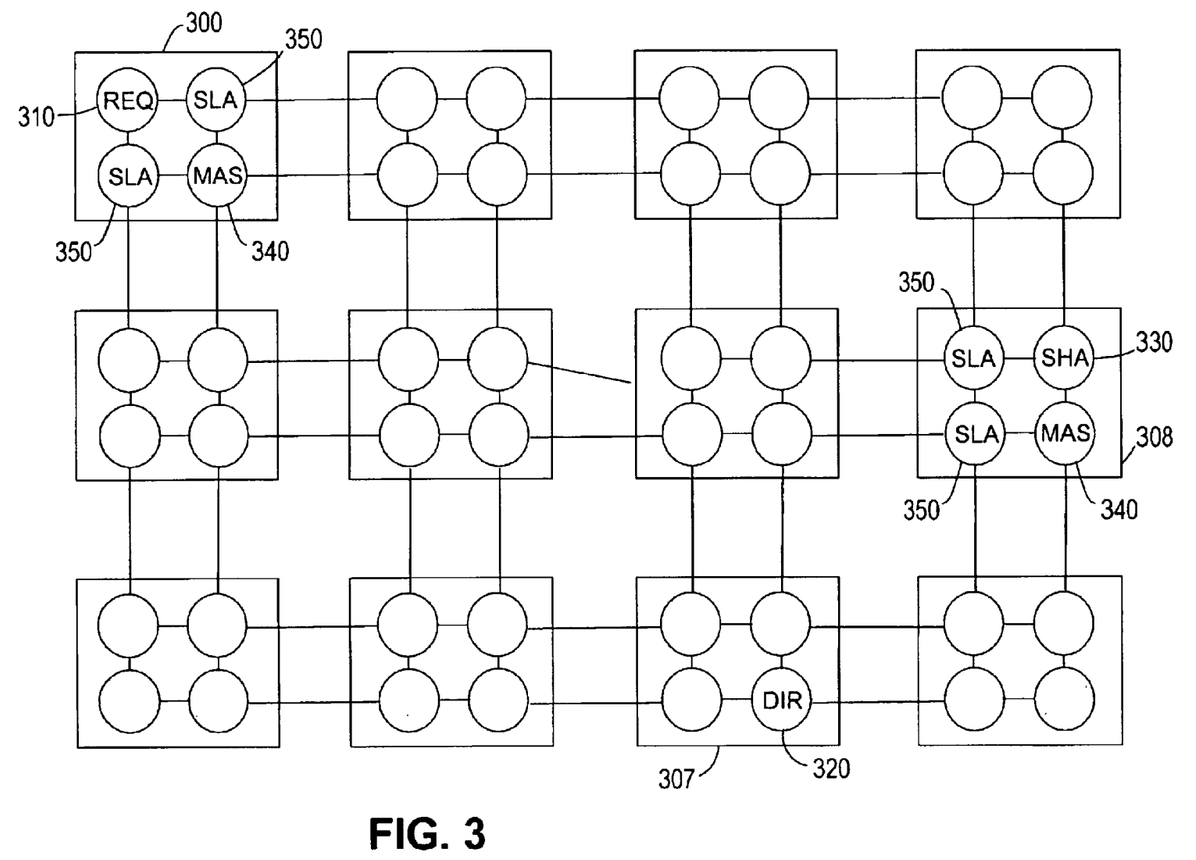
FIG. 3 shows a system diagram of a plurality of microprocessors grouped together in clusters.

FIG. 3 represents a multi-processor system configured to use the hybrid invalidate scheme. Whereas the system shown in FIG. 1 comprises 12 processors 100, the system shown in FIG. 3 comprises 12 clumps or clusters 300. Within each cluster, there are four processors 310. The number of clusters in a system is determined by the size of the share mask. As discussed above, the share mask for the multi-processor system shown in FIG. 1 forms a part of the directory structure for each cache block and is preferably comprised of a 20-bit data register. In the example system shown in FIG. 1, 12 of the 20 bits are used to track share locations of a data block. That same share mask may be used for the system shown in FIG. 3. In the system shown in FIG. 3, a bit in the share mask no longer corresponds to a particular processor or node, but rather to a cluster number. The size of the share mask therefore determines the number of processors or clusters that may exist in the multi-processor system.

The number of processors in a clustered system is determined by the value in the PID-SHIFT register. For a non-zero value, n, in the PID-SHIFT register, there are $2^n$ processors in each cluster. For the system in FIG. 3, the PID-SHIFT register would hold the value two, which corresponds to four processors per cluster.

Figure 4:
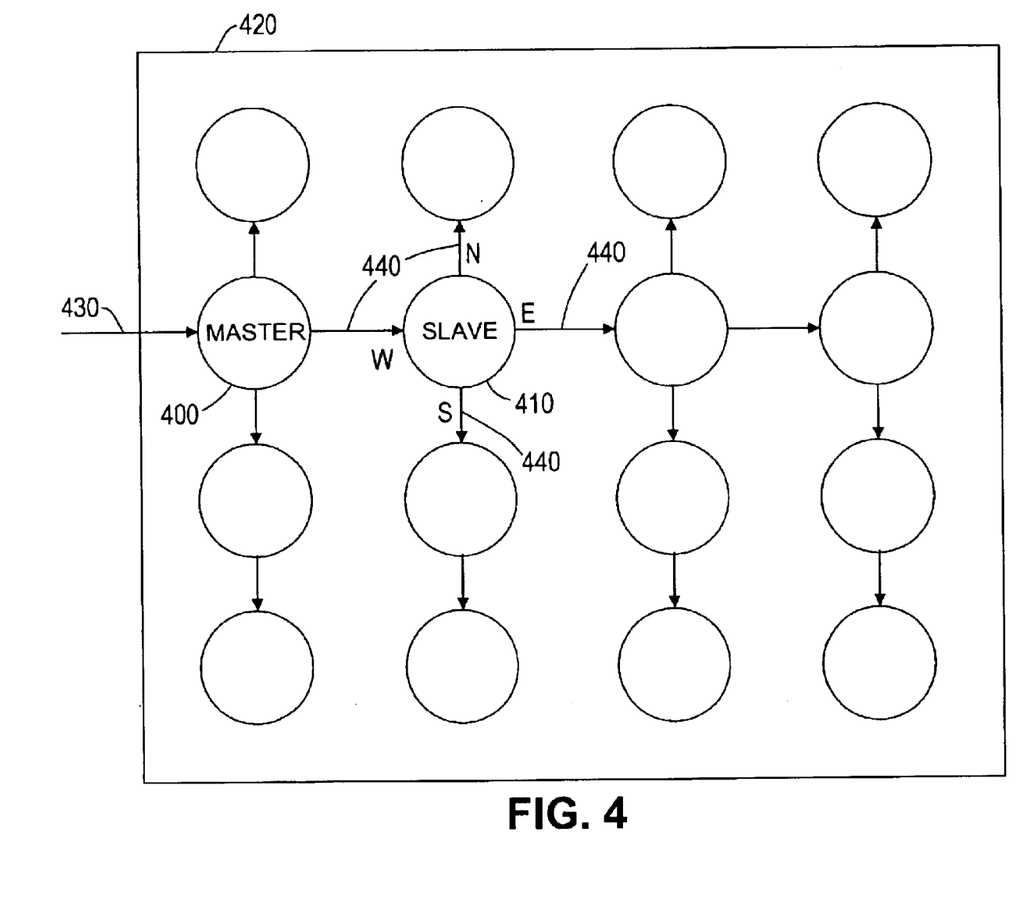
FIG. 4 shows a broadcast invalidate distribution scheme for a cluster of microprocessors.

FIG. 4 shows an exemplary cluster 420 comprised of 16 processors. Within each cluster, one of the processors is designated a master 400. The remaining processors are designated slaves 410. The master 400 is the central hub through which all invalidate and acknowledgment messages in a given cluster must travel. If the master or at least one of the slaves 410 contains a shared data block in a local memory cache, the bit in the share mask corresponding to that cluster will be set to indicate that a shared copy of the data block resides within that cluster. Description of signal propagation through the cluster is discussed below.

Referring again to FIG. 3, the hybrid invalidate scheme has some aspects in common with the conventional directory based scheme discussed above. Consider a memory block residing in a memory coupled to processor 320 located within cluster 307. As above, processor 320 is therefore called the owner of the memory block may preferably be called the directory node. Consider also that copies of the memory block have been distributed to processors 310 and 330 located within clusters 300 and 308, respectively. If processor 310 needs to modify the shared block of data, processor 310 will transmit a requests for exclusive ownership of the data block to the directory node 320.

Directory node 320 will preferably respond with three separate messages. The first message is a response to requestor node 310 indicating there are two clusters that share a copy of the data block and that two InvalAck messages must be received prior to modifying the data block. Upon receiving this first message, the requester node 310 preferably changes the state of the shared block of memory to exclusive. The second and third messages are broadcast share invalidate messages, ShareInvalBroadcast, that are sent to the sharing clusters. In the present example, the directory node knows that a shared copy of the data exists in clusters 308 and 300. Requestor node 310 in cluster 300 has one copy of the data, but there may be another copy of the data in one of the other nodes in cluster 300. Hence, an invalidate message must be sent to cluster 300 as well as cluster 308.

The ShareInvalBroadcast message differs from the ShareInval message defined above in that it is sent to the master processor in a cluster to indicate the need to broadcast an invalidate message to all processors in a cluster. In the preferred embodiment, the ShareInvalBroadcast message is sent only to clusters within which a shared copy of the data block exists. More specifically, this ShareInvalBroadcast message is sent only to the master node 340 of those clusters. The master processor 340 then distributes a broadcast invalidate message to every slave processor 330, 350 in the cluster. The slave processors 330, 350 preferably receive the broadcast invalidate message and, if a shared copy of the data block resides in the local cache and the processor is not a requester, the status of that data block is changed to invalid and an acknowledgement is sent back to the master node 340. If the slave processor 350 does not have a shared copy of the data block in local cache, no action other than responding with an acknowledgement is taken. Once acknowledgments from all slave nodes 330, 350 in the cluster are received by the master node 340, the master node 340 sends a single invalidate acknowledgement to the requestor node 310.

In the present example of the preferred embodiment, the master node 340 of cluster 308 distributes a broadcast invalidate message to all slaves 350 including the sharing node 330. The non-sharing slave nodes 350 do not need to update the status of any cache blocks in response to this invalidate message and simply respond with an acknowledgment that the broadcast message was received. Sharing node 330 will update the status of the shared cache block to invalid and respond to its parent node with an acknowledgment. Upon receiving all slave acknowledgments, master processor 340 will change the status of its own shared copy of the data block, if it exists. Alternatively, the master processor my change the status of the a shared copy of the data block when it receives the ShareInvalBroadcast message from the directory node 320. Master processor 340 will then send a single InvalAck message to the requestor node 310.

A ShareInvalBroadcast message is also sent to the master processor 340 located in cluster 300. The invalidate message is broadcast within this cluster in much the same way it is broadcast in cluster 308. The main difference in this cluster 300 is that slave processor 310 is also the requester. Thus, when processor 310 receives an invalidate request, the request is ignored and an acknowledgement is sent to its parent node as if the invalidate command was followed. When the master node 340 in this cluster 300 receives all acknowledgments from the slave nodes 310, 350, the master node 340 will send an InvalAck message to the requestor node 310. Upon receiving acknowledgements from the master processors 340 in clusters 300 and 308, the requestor node 310 may then modify the exclusive data block.

Referring again to FIG. 4, the transmission and distribution of the broadcast invalidate message will now be discussed. In order to avoid deadlock within a cluster, the broadcast message is expected to be fanned out and fanned in using a specified path. The master node 400 is the root of the fan-out/fan-in tree. After receiving a ShareInvalBroadcast message 430, the master processor 400 preferably buffers the command in an internal structure called an inval widget. The master node 400 then transmits a SpecialInvalBroadcast message 440 within the cluster. Like the ShareInval message defined above, the SpecialInvalBroadcast message is the command to change the status of a shared data block to invalid. It differs from the ShareInval message in that the ShareInval is sent only to sharing nodes in a point-to-point implementation of the invalidate scheme and the SpecialInvalBroadcast message is broadcast to all nodes in a cluster in the hybrid invalidate scheme.

It should be noted that while only one master node 400 is shown in FIG. 4, any of the nodes in the cluster may act as master node. Different directory structures in fact may preferably recognize different masters for any given cluster to alleviate traffic congestion problems that may arise if only one master is used per cluster. Propagation of the broadcast invalidate signals may occur simultaneously because of the unique propagation settings residing in the CSRs 195. Determination of which processor in a cluster is the master is governed by settings in the router lookup table located within the router unit ("Rbox") 200. The directory node 320 preferably sends an invalidate message that includes the destination cluster number (corresponding to a bit location in the share mask) to the Rbox 200. The Rbox, in turn, converts the cluster number to a master processor identification and forwards the ShareInvalBroadcast message to that master processor.

Each node in the cluster is configured to propagate the SpecialInvalBroadcast message 440 in predetermined directions based on the direction from which the incoming message was received. For instance in FIG. 4, slave node 410 receives a SpecialInvalBroadcast message 440 from master node 400 at the West input port. A control and status register ("CSR") 195 contains configuration information that slave node 410 will use to determine to which nodes the SpecialInvalBroadcast message 440 should be propagated. This CSR 195 is preferably called the RBOX_W_CFG [BRO] register. Similar registers exist for the north, south, and east compass point ports called RBOX_N_CFG [BRO], RBOX_S_CFG[BRO], and RBOX_E_CFG [BRO], respectively. In the cluster shown in FIG. 4, the RBOX_W_CFG[BRO] register indicates that upon receiving the SpecialInvalBroadcast signal from the West, the message should be propagated to the north, east and south output ports. The contents of these registers need not be the same as each other and may vary from processor to processor. The RBOX_W_CFG[BRO] register may preferably comprise a 4 bit data register with each bit corresponding to one of the four compass direction output ports. Message propagation is determined by bits that are set within this register. If none of the bits are set in a given register, broadcast message propagation is not required. In such a case, invalidation and acknowledgement are the only actions required. Each slave will preferably include unique fan-in/fan-out information stored in the CSR 195. The CSR 195 settings preferably reside in the router unit ("Rbox") 200.

At each node, a new inval widget entry is allocated upon receipt of the SpecialInvalBroadcast message 440. The invalidate message is forwarded on to all children as indicated by settings in the CSR 195. The inval widget entry waits for all children processors in its subtree to complete before it completes. The inval widget also waits for the invalidate on the local processor to complete. Thus, once the children of a given node complete the invalidate action and the local invalidate action is complete, the inval widget entry is deallocated and a broadcast invalidate complete message is sent to the parent node. This process is repeated for each node in the cluster until the master node 400 receives a complete message from each of its children. Once the master node 400 receives all complete messages and completes its own invalidate, the master node 400 will deallocate its own inval widget and transmit a single InvalAck message to the requesting processor 310.

It should be noted that the fan out scheme depicted in FIG. 4 is only one of many possibilities. Other paths may be selected based on factors such as optimization or consistency. The description herein and the claim limitations are not intended to limit the scope of the intra-cluster broadcast propagation scheme.

Figure 5:
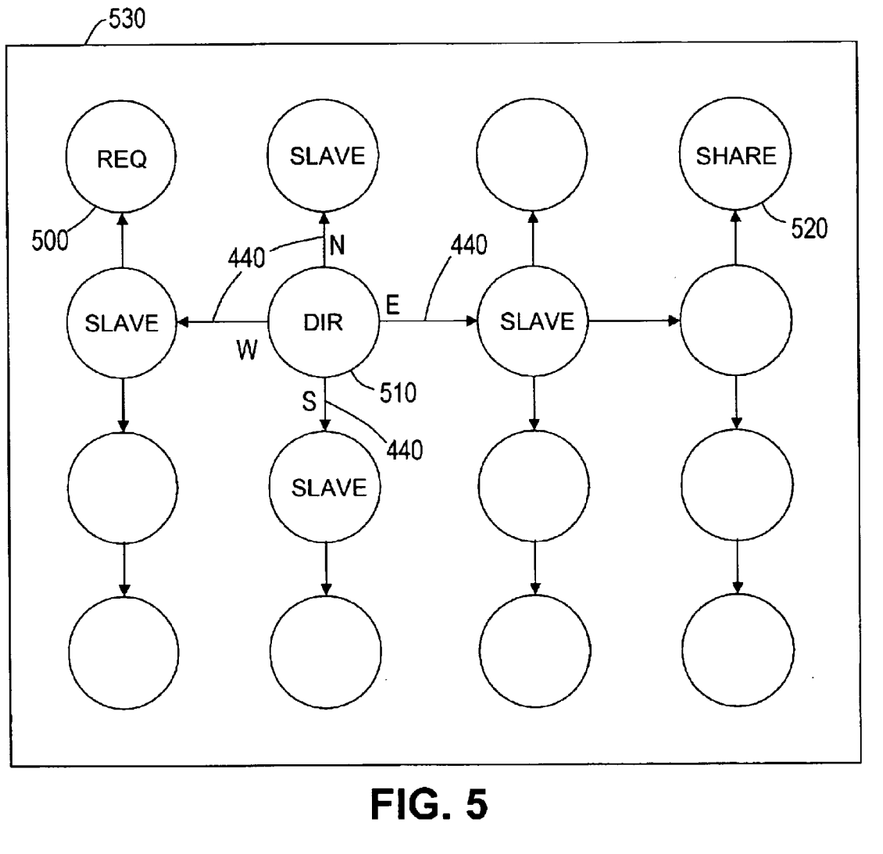
FIG. 5 shows a broadcast invalidate distribution scheme for a cluster of microprocessors where the invalidate request node, directory node, and a sharing node exist in the same cluster.

FIG. 5 represents an application of the preferred embodiment where a requestor node 500, directory node 510 and sharing node 520 all reside within the same cluster 530. Upon receipt of an exclusive request from node 500, the directory node 510 determines from the share mask that at least one shared copy of the data block are within the local cluster. In this situation, rather than transmit a SharedInvalBroadcast message 430 to the master node (as defined by the router table), the directory node 510 simply assumes the position of broadcast master. The directory node preferably transmits a response to the requestor node 500 indicating the number of sharing clusters in existence. In general, other clusters may have a shared copy of the data block. If this is the case, a broadcast invalidate message is sent to the master processor of the sharing cluster as discussed above. Upon receiving this first message from the directory node 510, the requestor node 500 may change the status of its own copy of the data to exclusive. The directory node 510 also transmits the SpecialInvalBroadcast message 440 to all slaves nodes in the cluster. This broadcast message fans out and fans in as discussed above. Once all children in the cluster (except the requesting node 500) have completed or acknowledged the invalidate process, the directory node sends an InvalAck message to the requestor node 500. If there are other sharing clusters, the requestor node waits for InvalAck messages from those clusters before the requestor node 500 can modify the data block.

The above discussion is meant to be illustrative of the principles and various embodiments of the present invention. Numerous variations and modifications will become apparent to those skilled in the art once the above disclosure is fully appreciated. For example, a different means of controlling the number of clusters and the number of nodes or sub-clusters within clusters may be used. It is intended that the following claims be interpreted to embrace all such variations and modifications.

What is claimed is:

1. A method for managing distribution of messages for changing the state of shared data in a computer system having a main memory, a memory management system, a plurality of processors, each processor having an associated cache, and employing a directory-based cache coherency comprising the method of:

grouping the plurality of processors into a plurality of clusters;

tracking copies of shared data sent to processors in the clusters;

receiving an exclusive request from a processor requesting permission to modify a shared copy of the data;

generating invalidate messages requesting that other processors sharing the same data invalidate that data;

sending the invalidate messages only to clusters actually containing processors that have a shared copy of the data in the associated cache; and broadcasting the invalidate message to each processor in the cluster;

wherein the invalidate message is sent to one master processor in a cluster, and the method further comprises;

the master processor distributing the invalidate message to one or more slave processors and waiting for an acknowledgement from said one or more processors;

if said one or more slave processors are configured to do so, distributing the invalidate message to one or more other slave processors, if any exist, and waiting for an acknowledgement from said other slave processors;

a slave processor which does not distribute the invalidate message to any other processor replying with an acknowledgement to the processor from which the invalidate message was received; and upon receiving acknowledgements from all processors to which the invalidate messages were sent, a slave processor replying with an acknowledgement to the processor from which the invalidate message was received;

wherein upon receiving an invalidate message, the processor invalidating a local copy of the shared data, if it exists, and wherein upon receiving acknowledgements from all slave processors to which the invalidate messages were sent, the master processor sending an invalidate acknowledgment message to the processor that originally requested the exclusive rights to the shared data.

2. The method of claim 1, wherein:

the slave processors to which the master processor distributes the invalidate message are determined by data registers associated with the master processor; and any other slave processors to which the slave processors distribute the invalidate message are determined by data registers associated with each slave processor;

wherein data registers exist and may be unique for each processor entry port.

3. The method of claim 1, wherein:

tracking of the shared copies of the data sent to the clusters is performed by setting a bit in a data register with at least as may bit positions as there are clusters;

wherein each cluster is associated with one bit position in the data register.

4. The method of claim 3, wherein sending the invalidate messages only to one master processor in a cluster actually containing processors that have a shared copy of the data in the associated cache further comprises the steps of:

selecting only the bit positions containing a set bit;

cross referencing the bit positions with cluster numbers;

cross referencing cluster numbers with an actual processor identification; and delivering the invalidate message to the processor associated with the processor identification.

5. A method for managing distribution of messages for changing the state of shared data in a computer system having a main memory, a memory management system, a plurality of processors, each processor having an associated cache, and employing a directory-based cache coherency comprising the method of:

grouping the plurality of processors into a plurality of clusters;

tracking copies of shared data sent to processors in the clusters;

receiving an exclusive request from a processor requesting permission to modify a shared copy of the data;

generating invalidate messages requesting that other processors sharing the same data invalidate that data;

sending the invalidate messages only to clusters actually containing processors that have a shared copy of the data in the associated cache;

broadcasting the invalidate message to each processor in the cluster;

distributing the main memory among and coupled to each of the plurality of processors and each processor comprising a directory controller for the main memory coupled to that processor;

the directory controller managing the main memory location for the share data and tracking the copies of shared data sent to processors in the clusters;

the processor requesting exclusive ownership of the shared data delivering the request to the directory controller; and the directory controller sending the invalidate messages to master processors in clusters actually containing processors that have a shared copy of the data.

6. A method for managing distribution of messages for changing the state of shared data in a computer system having a main memory, a memory management system, a plurality of processors, each processor having an associated cache, and employing a directory-based cache coherency comprising the method of:

grouping the plurality of processors into a plurality of clusters;

tracking copies of shared data sent to processors in the clusters;

receiving an exclusive request from a processor requesting permission to modify a shared copy of the data;

generating invalidate messages requesting that other processors sharing the same data invalidate that data;

sending the invalidate messages only to clusters actually containing processors that have a shared copy of the data in the associated cache;

broadcasting the invalidate message to each processor in the cluster;

upon receiving a request from a processor requesting permission to modify a shared copy of the data, sending a response to the requesting processor indicating the number of additional shared copies of the data;

changing the state of the shared data by the requesting processor from shared to exclusive; and waiting to modify the exclusive data until acknowledgments arrive from the clusters actually containing processors that have a shared copy of the data in the associated cache.

7. The method of claim 6, wherein:

when the processor requesting exclusive ownership of the shared data, the directory controller, and shared copies of the data exist within the same cluster, the directory node assumes the position of master node and broadcasts the invalidate message to all the processors in the cluster.

8. A multiprocessor system, comprising:

a main memory configured to store data;

a plurality of processors, each processor coupled to at least one memory cache;

a memory directory controller employing directory-based cache coherence;

at least one input/output device coupled to at least one processor;

a share mask comprising a data register for tracking shared copies of data blocks that are distributed from the main memory to one or more cache locations; and a PID-SHIFT register which stores configuration settings to determine which one of several shared data invalidation schemes shall be implemented;

wherein when the PID-SHIFT register contains a value of zero, the data bits in the share mask data register correspond to one of the plurality of processors and wherein when the PID-SHIFT register contains a nonzero value, the data bits in the share mask data register correspond to a cluster of processors, each cluster comprising more than one of the plurality of processor;

wherein if the value in the PID-SHIFT register is zero, the directory controller sets the bit in the share mask corresponding to the processor to which a shared copy of a data block is distributed and wherein if the value in the PID-SHIFT register is nonzero, the directory controller sets the bit in the share mask corresponding to the cluster containing a processor to which a shared copy of a data block is distributed; and wherein the nonzero value in the PID-SHIFT register determines the number of processors in each cluster.

9. A multiprocessor system, comprising:

a main memory configured to store data;

a plurality of processors, each processor coupled to at least one memory cache;

a memory directory controller employing directory-based cache coherence;

at least one input/output device coupled to at least one processor;

a share mask comprising a data register for tracking shared copies of data blocks that are distributed from the main memory to one or more cache locations; and a PID-SHIFT register which stores configuration settings to determine which one of several shared data invalidation schemes shall be implemented;

wherein when the PID-SHIFT register contains a value of zero, the data bits in the share mask data register correspond to one of the plurality of processors and wherein when the PID-SHIFT register contains a nonzero value, the data bits in the share mask data register correspond to a cluster of processors, each cluster comprising more than one of the plurality of processor;

wherein when more than one shared copy of a data block exists outside of the main memory; and wherein in response to a request from a requesting processor for exclusive write access to one of the shared copies of the data block; and wherein when the value in the PID-SHIFT register is zero, the directory controller transmits an invalidate message only to those processors whose corresponding bits in the share mask are set, except the requesting processor; and wherein when the value in the PID-SHIFT register is nonzero, the directory controller transmits an invalidate message only to those clusters whose corresponding bits in the share mask are set.

10. The system of claim 9 wherein the cluster further comprises:

a master processor to which the invalidate message directed toward the cluster are delivered; and one or more slave processors, each of which receive an invalidate message that is generated by the master processor.

11. The system of claim 10 further comprising:

a processor router table that includes cross reference information which correlates master processor identification with cluster numbers.

12. The system of claim 10 further comprising:

configuration registers associated with each port of a processor in a cluster which determine the path by which the invalidate message is broadcast within a cluster.

13. A multiprocessor system, comprising:

a memory;

multiple computer processor nodes, each with an associated memory cache; and a memory controller employing a directory-based cache coherency employing shared memory invalidation method, wherein:

the nodes are grouped into clusters;

the memory controller distributes memory blocks from the memory to the various cache locations at the request of the associated nodes;

upon receiving a request for exclusive ownership of one of the shared memory blocks, the memory controller distributes invalidate messages via direct point to point transmission to only those clusters containing nodes that share a block of data in the associated cache; and wherein when the invalidate message is received by a cluster, an invalidate message is broadcast to all nodes in the cluster;

the system further comprising:

a share mask data register with as many bit locations as there are clusters;

a router lookup table with cross reference information correlating bit locations in the share mask to one master nodes in each cluster;

wherein the memory controller determines to which cluster to send the invalidate message according to bits set in the share mask and sends the invalidate message to the router which then forwards the invalidate message to the node whose identification corresponds to the cluster number as indicated in the router table.

14. The system of claim 13 each node further comprising:
router control and status registers for each input port of the node which configure the node's broadcast forwarding scheme wherein the forwarding scheme determines to which, if any, nodes the node shall forward a broadcast invalidate message when a broadcast invalidate message is received at a given port.

15. The system of claim 14 wherein:
the router control and status registers are comprised of bit locations corresponding to each output port of the node; and
wherein if a bit location contains a set bit, the invalidate message is forwarded to the output port corresponding to that bit location; and
wherein if a bit location does not contain a set bit, the invalidate message is not forwarded to the output port corresponding to that bit location.

16. The system of claim 15 wherein the processors in a cluster invalidate shared data, if it exists, and generate and forward acknowledgments in reverse direction but along the same path followed by the invalidate messages.

* * * * *